Oct. 26, 1937.  D. J. CAMPBELL  2,096,707
CRANKSHAFT MOLDING
Filed Jan. 28, 1935  4 Sheets—Sheet 1
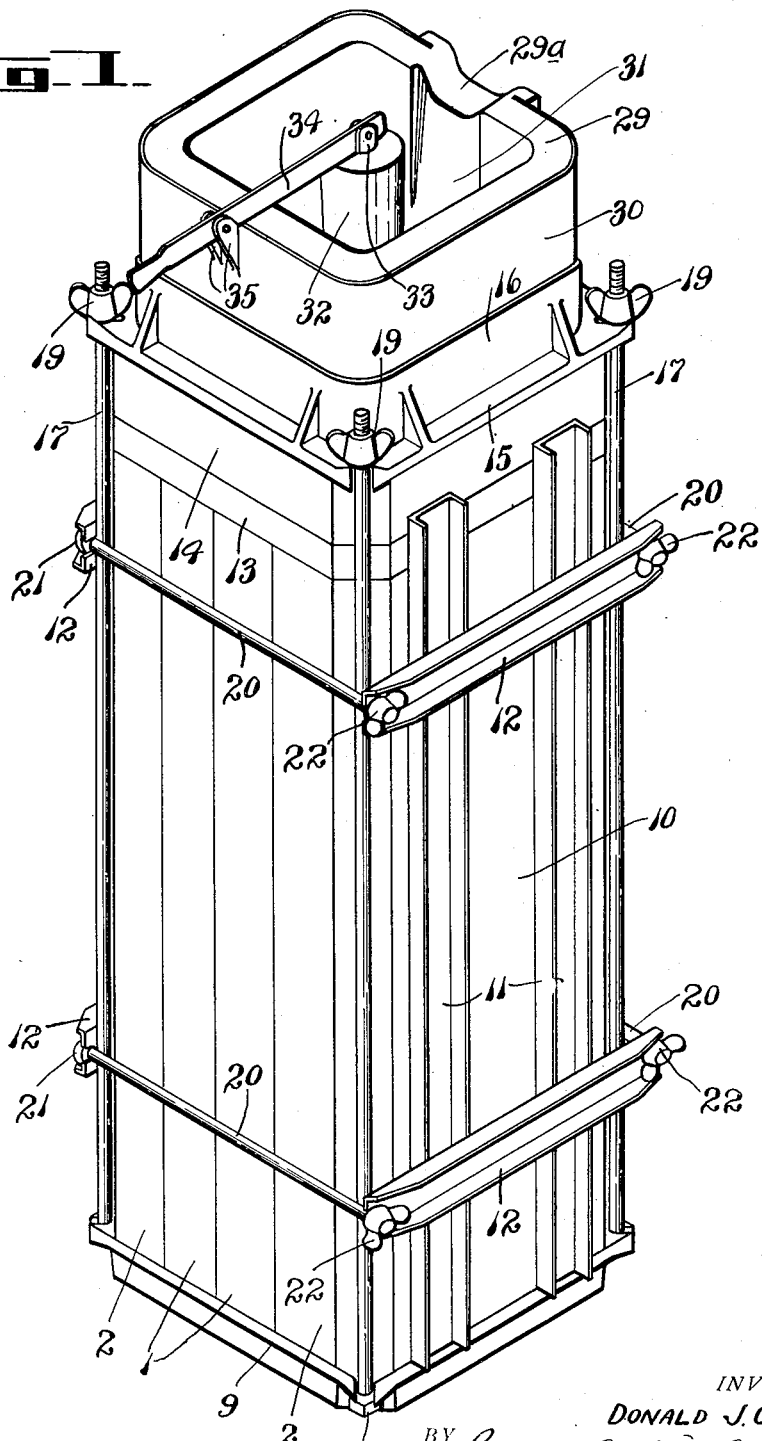
INVENTOR
DONALD J. CAMPBELL
BY
ATTORNEY Oct. 26, 1937.   D. J. CAMPBELL   2,096,707
CRANKSHAFT MOLDING
Filed Jan. 28, 1935   4 Sheets-Sheet 2
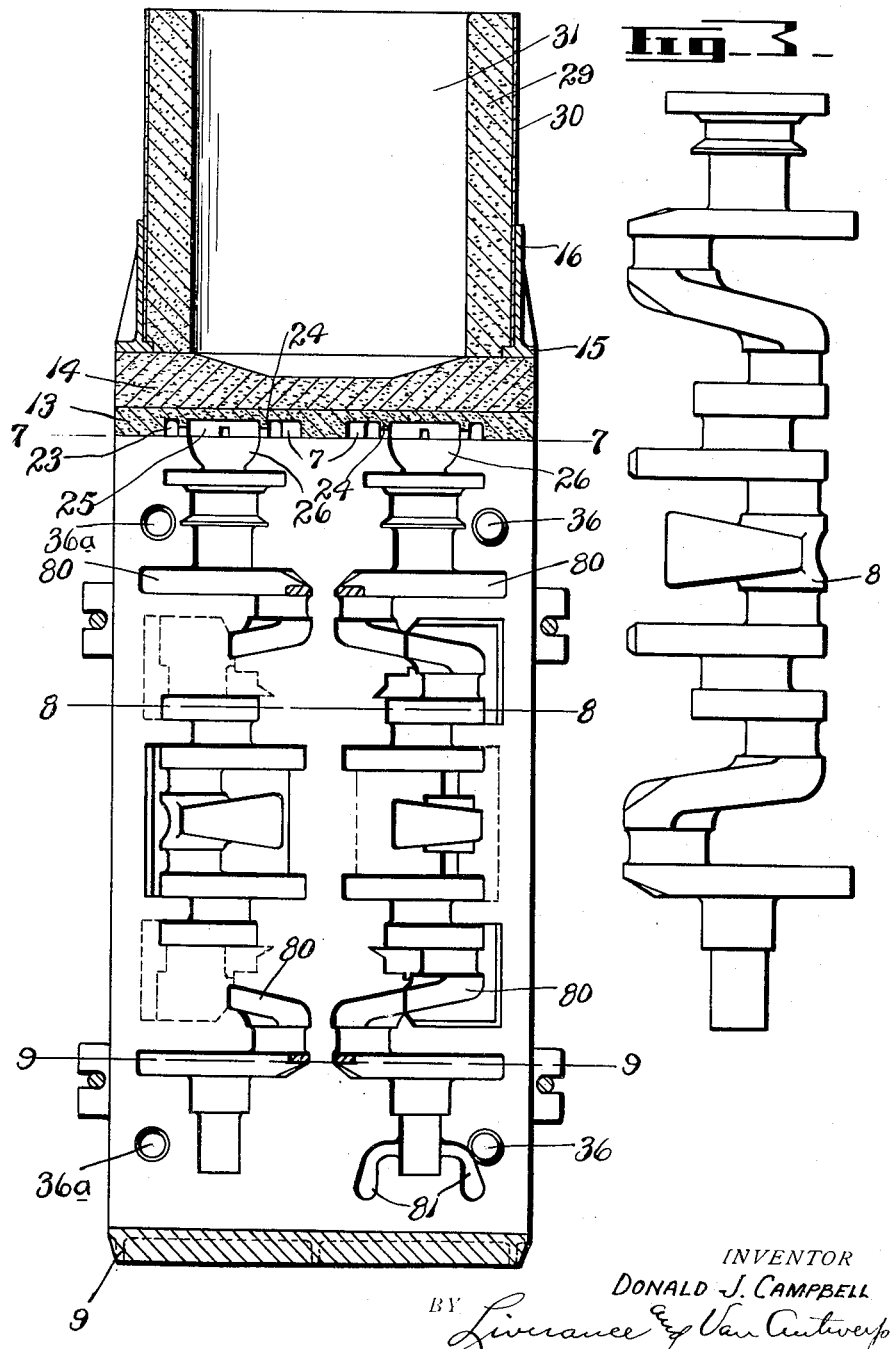
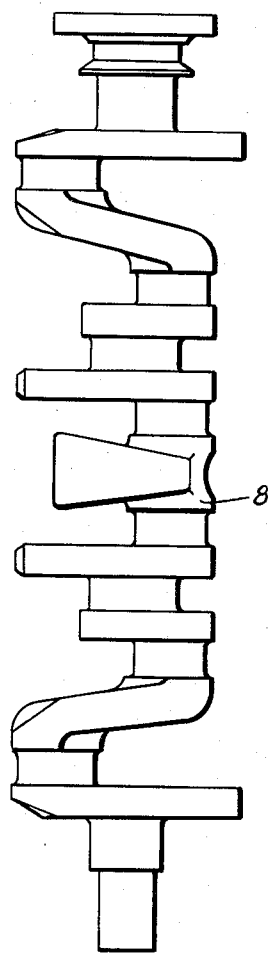
INVENTOR
DONALD J. CAMPBELL
BY
ATTORNEY Oct. 26, 1937.　　D. J. CAMPBELL　　2,096,707
CRANKSHAFT MOLDING
Filed Jan. 28, 1935　　4 Sheets-Sheet 3
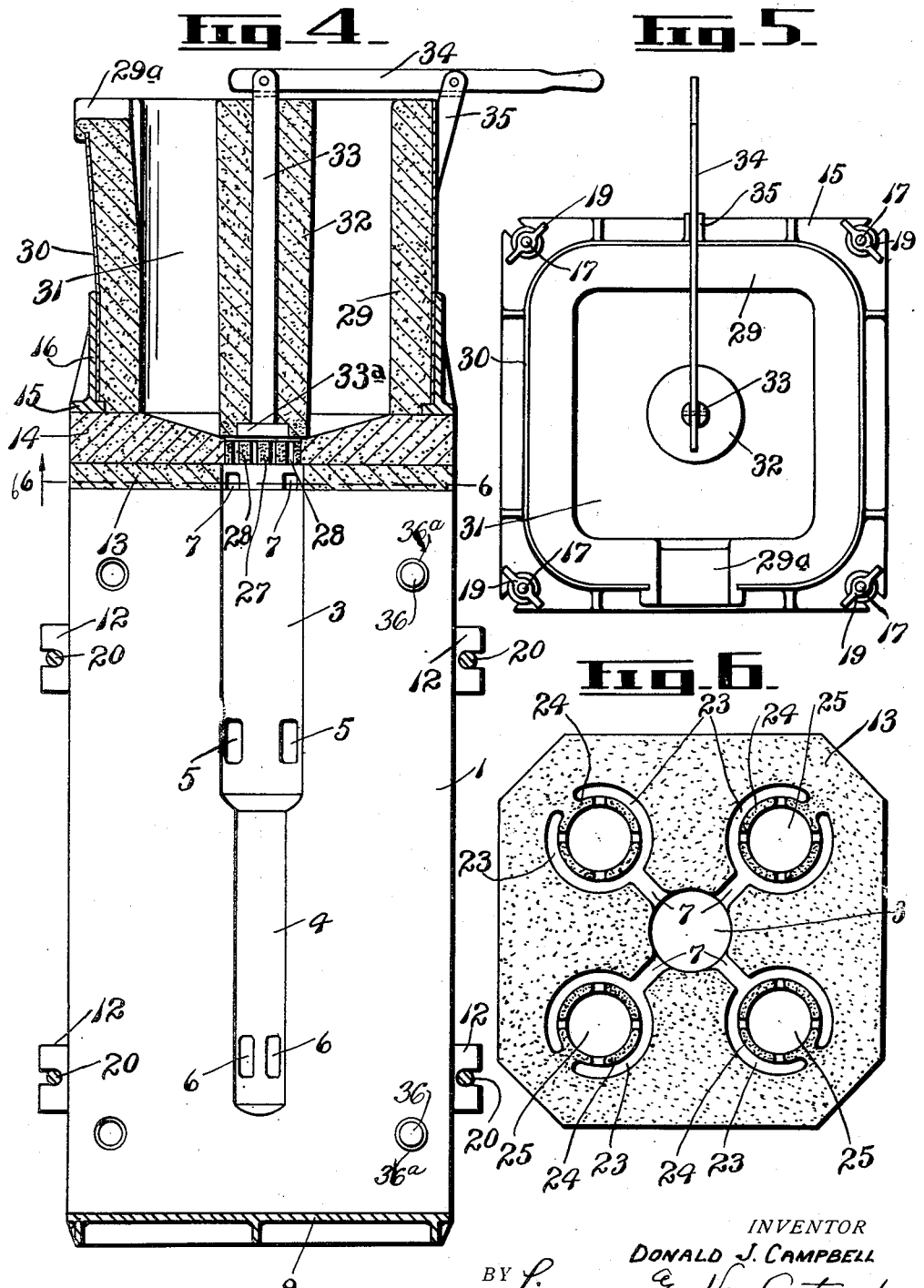
INVENTOR
DONALD J. CAMPBELL
BY Liverance & Van Antwerp
ATTORNEY

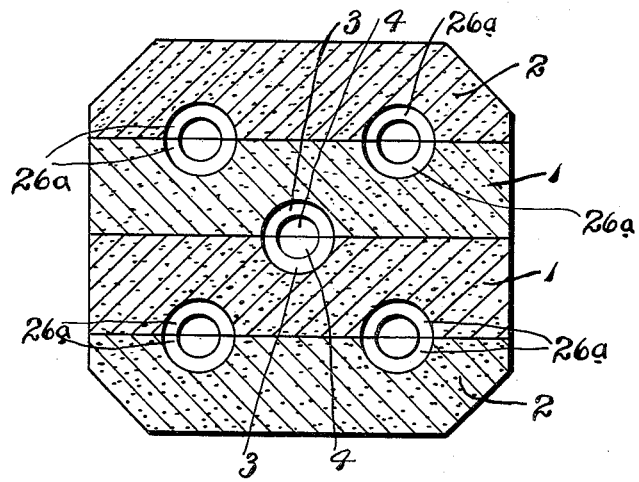
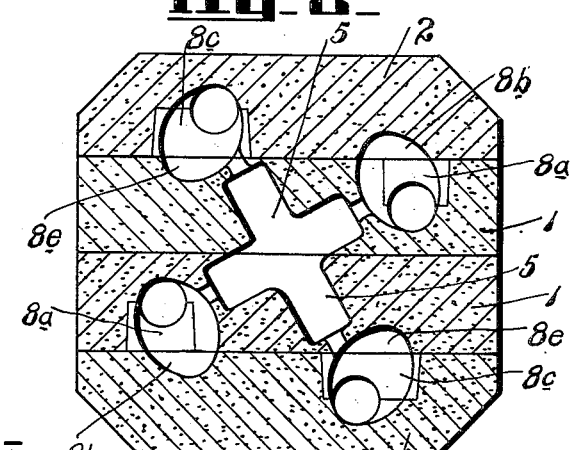
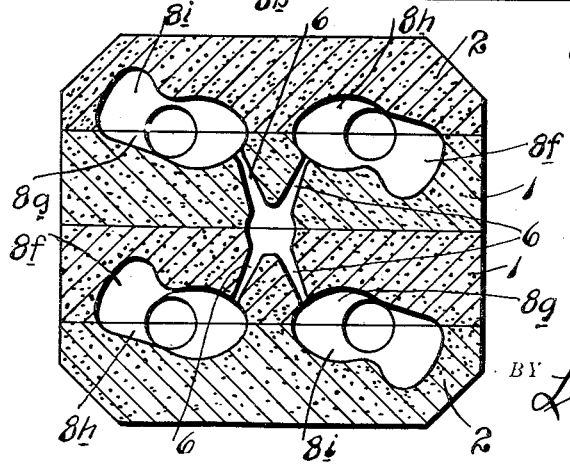

Patented Oct. 26, 1937

2,096,707

UNITED STATES PATENT OFFICE 2,096,707

CRANKSHAFT MOLDING

Donald J. Campbell, Spring Lake Township, Ottawa County, Mich., assignor to Campbell, Wyant & Cannon Foundry Company, Muskegon Heights, Mich., a corporation of Michigan Application January 28, 1935, Serial No. 3,764

5 Claims. (Cl. 22—79)

This invention relates to molds and a process or method of molding, particularly concerned with molds of an elongated character and for the production of irregularly shaped elongated castings, such as crank shafts used in multiple-cylinder internal combustion engines. It is the primary object of the present invention to produce a novel mold and process of casting with respect thereto, whereby such castings are produced much more economically than heretofore and are produced in a homogeneous, sound state throughout, free from foreign materials which would weaken the casting at the places where the material was trapped therein.

An understanding of the present invention may be had from the following description, taken in connection with the accompanying drawings, in which, Fig. 1 is a perspective view showing the assembled mold.

Fig. 2 is a vertical section through the mold and to one side thereof between an outer and one of the inner mold slabs, a plurality of which slabs are used in building up the mold.

Fig. 3 is an elevation of a crank shaft produced in the mold.

Fig. 4 is a central vertical section through the mold taken between the two inner slabs, whereby an inner slab is shown in elevation.

Fig. 5 is a plan view of the mold.

Fig. 6 is a horizontal section substantially on the plane of line 6—6 of Fig. 4, looking upwardly.

Figs. 7, 8 and 9 are horizontal sections substantially on the planes of lines 7—7, 8—8 and 9—9 of Fig. 2.

Like reference characters refer to like parts in the different figures of the drawings.

In the construction of the mold a plurality of flat slabs are provided, four being shown. The two inner slabs I are identical in form, and likewise the two outer slabs 2 are identical. At one side of each of the slabs I a semi-cylindrical elongated recess 3 is made which is reduced in size at its lower portion at 4 so that when the two slabs are placed together with the recessed portions therein in conjunction (as in Fig. 7), a vertical cylindrical opening extends downwardly through the mold from its upper end to adjacent its lower end. There are branch passages or runner gates 5 and 6, the former located near the lower end of the opening provided by the semi-cylindrical recesses 3, the latter near the lower end of the recessed portions 4. Likewise, other runner gate openings 7 are made in a member which will be later described as located above the upper end of the assembled mold slabs.

At the outer sides of the slabs I and at the inner sides of the slabs 2, mold cavities are formed in sectional form in the various slabs. Figs. 8 and 9 illustrate two cross sections of the assembled mold. The crank shaft casting 8 (Fig. 3) which is to be reproduced is of irregular form, and the mold cavities which are made in the various slabs I and 2, partly in the slabs I and partly in the slabs 2, are of various shapes. There are mold cavities 8a and 8e at the outer sides of the slabs I (Fig. 8) and cooperating cavities 8b and 8c at the inner sides of the cooperating outer slabs 2 which together provide a cavity to form the portion of the crank shaft which is located at the plane of the line 8—8 of Fig. 2. Likewise in Fig. 9, the mold cavities in the slabs which are of different form, indicated at 8f and 8g, and at the inner sides of the slabs 2 indicated at 8h and 8i, are such that when the slabs are assembled they form a complete mold cavity to produce the portion of the crank shaft at the plane of line 9—9 of Fig. 2. Similarly throughout the major portion of the length of the inner slabs I the outer faces thereof are properly provided with the mold cavities which join with cooperating mold cavities at the inner surfaces of the outside slabs 2 to produce a continuous mold cavity in which, when molten iron is poured, a complete crank shaft casting is made. It will be evident that with the construction shown four of the crank shaft castings may be made in a single mold.

The slabs I and 2 are preferably made of core sand and baked in an oven so as to have the necessary strength and rigidity that they may be handled and readily assembled together. The four slabs are located vertically with their sides in proper contact and with their lower ends supported by a base 9. Against the outer sides 10 of the outer slabs 2 vertical channels II (Fig. 1), in spaced apart relation, are located extending from the base to above the upper ends of the slabs 2 so as to also bear against other completing members of the mold which will be hereafter described. Spaced apart cross bars 12, preferably of channel form for strength, are located horizontally against the channel bars 11. A slab or block 13 of the same material, that is, baked core sand, is placed horizontally over the upper ends of all of the slabs and above there is a second horizontal slab or block 14 of the same material. Above the block 14 there is positioned a metal base plate 15, in the form of an open frame, from the inner edges of which a continuously vertically positioned frame flange 16 extends.

The corners of the base 15 and of the bottom support 9 are slotted whereby tie rods 17, each having a head 18 at its lower end, may be inserted in the slots and thumb nuts 19 turned down upon the upper threaded end portions of the rods 17 against the upper side of the base frame 15, thereby binding the parts together. The ends of the bars 12 previously described are likewise slotted and horizontal rods 20, having heads 21 at one end, are located in said slots and have thumb nuts 22 threaded onto the opposite ends of said rods which, when tightened, securely hold the parts in assembled relation and against disconnection; yet permit quick and easy disassembly of the mold after the molten iron has been poured.

The horizontal plate or slab 13 has a central opening therein in axial alinement with the vertical opening at 3 extending downwardly into the assembled mold. The runner gates 7 extend radially therefrom, there being four of the gates, one for each crank shaft which is to be produced. These gates 7 at their outer ends join with curved enlargements 23 which substantially surround annular rings 24 formed with the member 13, through the sides of which are a plurality of passages leading to a central opening 25, said central opening being directly above each of the crank shaft mold cavities and over a cavity 26 provided at the upper end of each of the crank shaft mold cavities (Fig. 2). The uppermost horizontal slab 14 is downwardly recessed at its central portion, and at its center has a circular opening therein which receives a skim gate 27 having a plurality of small vertical passages 28 therethrough.

Within the frame flange 16 previously described a receptacle wall is positioned comprising an inner lining 29 of suitable refractory material within a thin metal outer wall 30, the lower end portion of which is received within the frame flange 16. This, with the member 14 serving as a bottom, provides a receptacle for receiving molten iron, the interior space 31 being adapted to be filled with molten iron to near its upper end, or until the overflow at 29a, made in one side of the receptacle, is reached.

The passages 28 in the skim gate 27 are closed by a valve which consists of a body 32 of refractory material having a cross sectional area such that at its lower end it completely covers the skim gate 27, and a length such that it extends above the level of the molten metal in the receptacle described. A metal rod 33 having a head 33a at its lower end extends lengthwise of and through the body 32. It is pivotally connected at its upper end to the inner end of a handle 34 which, in turn, is pivotally mounted and connected between its ends to ears 35 extending from the member 30. The outer free end of the handle 34 may be grasped and by exerting a downward force thereon the valve is lifted.

In order to insure the proper registry of the various mold cavities (which are indicated at 80 in Fig. 2) of the several slabs 1 and 2, suitable pins 36 project from the surface of the slabs to engage complementary holes 36a made in adjacent slabs to receive such pins. Each of the slabs carries both pins and holes or recesses.

In the operation of pouring the molten iron, the receptacle or runner box described is supplied with molten iron until the space 31 is filled. The valve closing the skim gate 27 is at its lower position. The handle 34 is depressed at its outer end, raising the valve, and the molten iron passes through the skim gate and downwardly through the passages 3 and 4 and first flows through the runner gates 6 to the lower part of the mold cavities 80. As shown in Fig. 2 the lower end of the mold cavities may be supplied with branch cavities 81 into which any free sand, dirt or other impurity which may be collected in the molten iron at the beginning of pouring will flow and be trapped. The molten iron rises in the mold cavities as the passage 4 is more and more filled until the runner gates 5 are reached, whereupon the passage of iron in the mold cavities will thereafter be through the runner gates 5 until the mold is substantially filled, or until the uppermost runner gates 7 are reached, whereupon the completion of filling the mold is through the latter runner gates. The cavities at 3 and 4 supply an excess of molten iron to the crank shaft mold cavities to contract shrinkage and also prevent draws or honey-comb cores within the castings.

With this invention crank shaft castings are produced economically and more cheaply than heretofore. The cooling and therefore solidification and shrinkage of the elongated casting starts first at the lower ends thereof while they are in the mold, and with a proper control of the passage of the molten iron from the runner box into the mold, the cooling and shrinking of the castings may be controlled so that there is a progressive cooling with attendant shrinking of the parts solidifying from the lower end of the castings to their upper ends, with a very substantial elimination of shrinkage effects of the type of what would occur in an elongated casting of the kind described if the metal was poured into the mold cavity simultaneously throughout its length.

It will be noted that in Fig. 8 and also in Fig. 2 certain of the mold cavities are enlarged and contain depressed portions with square corners so as to be of a substantially rectangular character exteriorly. This is required at times with certain crank shafts in which the patterns could not be drawn from the molds without complicating the sand slabs and box in which they are made. It occurs in most kinds of crank shafts. The crank shaft produced will have the additional metal caused by such enlarging of the mold cavities which may be machined off in any desired manner.

There are therefore produced crank shafts which are of a sound homogeneous character throughout. The molten metal used is of a suitable composition to get great strength and may be of a cast iron or cast steel alloy.

The invention, while specifically described with respect to the production of crank shafts, is also available for the production of many other articles of an elongated and irregular nature which are to be cast from iron or steel. The invention is defined in the appended claims and is to be considered as in no sense limited beyond the requirements of the terms of the claims.

I claim:
1. A mold wherein to cast elongated metal bodies which comprises a plurality of lengthwise extending slabs of molding sand having mold recesses formed in the sides thereof, some of the recesses extending entirely through the innermost slabs at a plurality of different levels into a common inlet passage, means for holding the slabs adjacent each other and against lateral displacement in relation to each other, and means for holding the slabs against longitudinal displace- ment with each other and a reservoir for holding molten metal for filling the mold cavities.

2. A mold wherein to cast elongated metal bodies which comprises a plurality of elongated slabs of molding sand having mold recesses formed in the sides thereof, some of the recesses extending entirely through the innermost slabs into a common inlet passage, means for holding the slabs adjacent each other and against lateral displacement in relation to each other, and means for holding the slabs against longitudinal displacement with each other and a reservoir for holding molten metal for filling the mold cavities and restricted openings for controlling the flow of molten metal from the common inlet passage to the several mold cavities.

3. A mold wherein to cast elongated metal bodies comprising a plurality of slabs of molding sand having mold recesses formed in the sides thereof, some of the recesses extending entirely through the innermost slabs into a common inlet passage, reinforcing means located at and contacting two opposite sides of the several slabs in parallelism to the said slabs, said reinforcing means having projections extending beyond the vertical edges of the adjacent slabs, holding means extending between the projections whereby the slabs may be held in assembled relationship, a bottom plate receiving the lower ends of the several slabs to support the same, an open frame receivable above and resting upon the tops of the several slabs and vertically extending holding means extending between the bottom plate and the open top frame to maintain these elements in position relative to one another.

4. A combination of elements as set forth in claim 3 in which the vertical extending means pass between the several slabs and the first mentioned reinforcing means and its holding means for the purpose described.

5. A mold of the class described comprising a sand body having a plurality of vertically extending recesses of desired shape and a central recess located intermediately of said mold recesses, gates connecting the central recess with the several first mentioned recesses, a horizontally positioned slab located above the said mold, said slab having an opening therethrough in alinement with the central recess, said slab also having a plurality of ducts leading from the medial opening to the top portions of the first several mentioned molds, means for providing the central recess with molten metal for the purpose described, said last mentioned means comprising a reservoir member fitting against the said slab member and valve means for controlling and varying the flow of molten metal downwardly into the central recess for the purpose described.

DONALD J. CAMPBELL.